United States Patent [19]

Harrison

[11] Patent Number: 4,754,372

[45] Date of Patent: Jun. 28, 1988

[54] FIBROUS COVERING MATERIAL WITH BUILT-IN FIBER OPTIC LIGHTING

[75] Inventor: John M. Harrison, Chattanooga, Tenn.

[73] Assignee: Collins & Aikman Corporation, New York, N.Y.

[21] Appl. No.: 12,741

[22] Filed: Feb. 9, 1987

[51] Int. Cl.⁴ .............................................. F21V 8/00
[52] U.S. Cl. .................................... 362/32; 362/153; 362/806
[58] Field of Search ................ 362/32, 806, 147, 153, 362/253; 52/127, 592, 811

[56] References Cited

U.S. PATENT DOCUMENTS

| | | |
|---|---|---|
| 2,457,619 | 12/1948 | Yocum . |
| 2,665,561 | 1/1954 | Yocum . |
| 4,110,818 | 8/1978 | Hempsey .............................. 362/32 |
| 4,234,907 | 11/1980 | Daniel . |
| 4,304,969 | 12/1981 | Hamilton et al. .................... 362/806 |
| 4,340,929 | 7/1982 | Konikoff et al. ..................... 362/153 |
| 4,347,499 | 8/1982 | Burkman, Sr. et al. . |
| 4,519,017 | 5/1985 | Daniel ................................. 362/806 |

Primary Examiner—Ira S. Lazarus
Assistant Examiner—D. M. Cox
Attorney, Agent, or Firm—Bell, Seltzer, Park & Gibson

[57] ABSTRACT

An illuminable covering of a textile material having a fibrous face with at least one lighting source connected to the back of the textile material is disclosed. A plurality of light-transmissive fibers are connected to the light source and emanate therefrom, with their free end portions terminating adjacent the fibrous face of the textile material for transmitting light thereto when the light source is energized. In a preferred embodiment of the invention, the textile material is a floor covering material such as a carpet or rug.

19 Claims, 2 Drawing Sheets

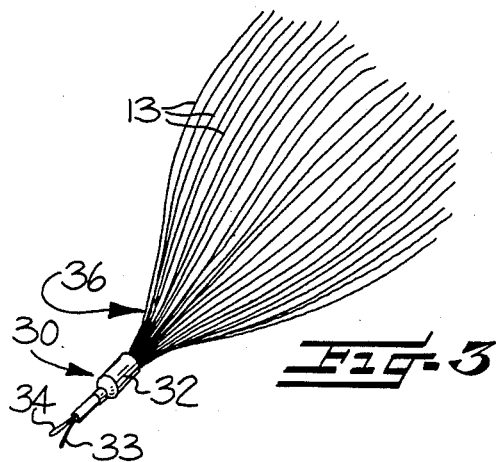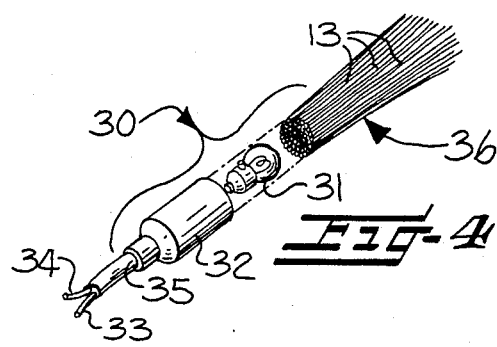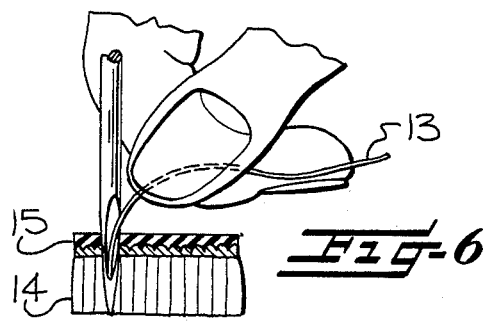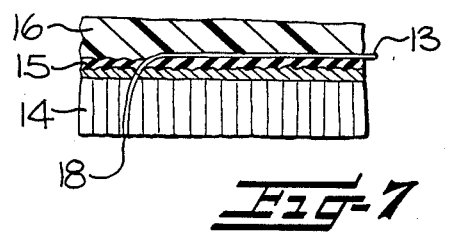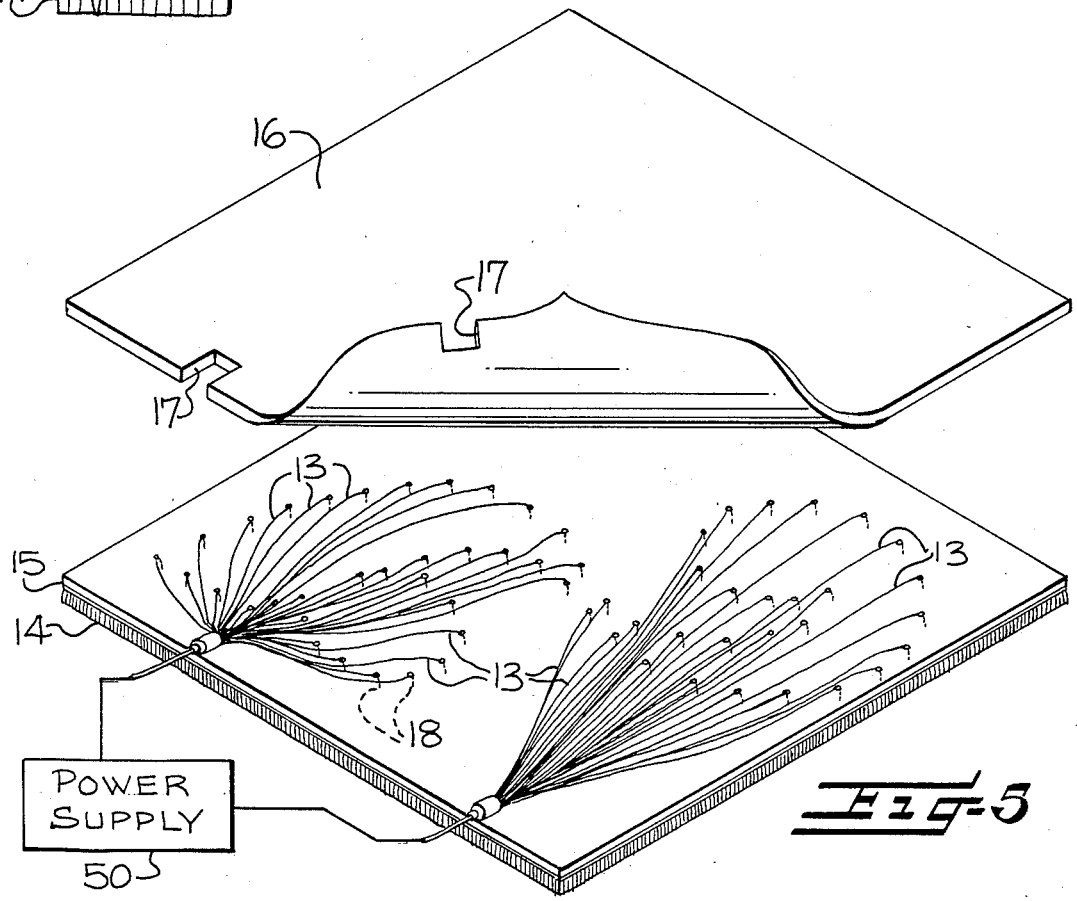

FIBROUS COVERING MATERIAL WITH BUILT-IN FIBER OPTIC LIGHTING

NATURE OF THE INVENTION

The present invention relates to illuminable covering materials generally, and particularly relates to illuminable fibrous covering materials for floor and wall surfaces which carry independent light sources.

BACKGROUND OF THE INVENTION

Illuminable covering materials are used as a decorating tool for covering floor and wall surfaces, and are used for providing directional indicators (and other visual signals) in occupied structures. Fibrous covering materials which use light-transmissive fibers to transmit light to the top surface of the material are available from Silvaseam Ltd. (Dendrick Mill, Holywell Green, West Yorkshire, England). In these devices, the light-transmissive fibers enter the covering material from external light sources. Such an arrangement provides numerous advantages for some end uses, such as the ability to quickly and easily change the color of the light source. Nevertheless, this arrangement is expensive, because long lengths of light-transmissive fibers are required. In addition, the long length of the fibers produces a decrease in the intensity of the light traveling therein, resulting in a need for more expensive, higher output light sources.

A light emitting fabric suggested as useful for making, among other things, clothing, rugs, and draperies, is disclosed in U.S. Pat. No. 4,234,907 to Daniel. In this fabric, light emitting fibers form part of the weave in place of thread. An external light source is disclosed, and the light is emitted from the fibers primarily through scratches in the sides thereof, rather than from free ends of the fibers. Like the Silverseam product discussed above, this product requires longer lengths of light transmissive fibers, and more expensive external light sources.

The limitations of the devices described above, along with other limitations which are inherently present in any one particular device, have reduced the number of end uses to which such illuminable covering materials may be put. It is, accordingly, an object of the present invention to provide an illuminable covering material which is suitable for use with smaller, less expensive light sources. A related object is to provide an illuminable covering material which is suitable for use with shorter, less expensive, lengths of light transmissive fibers.

SUMMARY OF THE INVENTION

The present invention is an illuminable covering, comprising a textile material of a predetermined size and shape, and having a fibrous face. At least one lighting means, serving as an independent light source, is positioned on and connected to the back of the textile material. A plurality of elongate, light-transmissive fibers are connected to the lighting means and emanate therefrom. These fibers have free end portions terminating adjacent the fibrous face of the textile material for transmitting light thereto when the lighting means are energized. The textile material is preferably a floor covering material, such as a carpet or rug.

The present invention, in another aspect, is an illuminable modular fibrous covering unit adapted for overlying a wall or floor surface. A modular unit is, broadly, any unit which is manufactured in a standard size without reference to a particular application, which is installed on a floor or wall in abutting relation to other such units to form a covering, and which is provided in the form of a flat, unrolled unit (rather than rolled carpet). Such a covering unit comprises a carpet having a fibrous face and a primary backing supporting the fibrous face, at least one lighting means connected to the back of the primary backing, and a plurality of light-transmissive fibers connected to each of the lighting means, with the light-transmissive fibers having free end portions penetrating the primary backing and terminating adjacent the top surface of the fibrous face for transmitting light thereto when the lighting means is energized.

Also disclosed herein is an apparatus for providing a visually discernible illuminable pattern on a floor, or on a wall, within a structure. The apparatus comprises a carpet covering the floor, or a covering mounted on the wall. The carpet and the covering are as described above. These apparatus further comprise power means electrically connected to the lighting means. When the lighting means are energized by the power means, a visually discernable pattern appears in the covering material.

BRIEF DESCRIPTION OF THE DRAWINGS

The foregoing and other features, objects and advantages of the invention are explained in the following description of the preferred embodiments and the drawings, in which:

FIG. 3 depicts a lighting means of the present invention having a plurality of light-transmissive fibers connected thereto.

FIG. 4 is similar to FIG. 3, but is an exploded view thereof.

FIG. 5 is a perspective view of the rear face of a modular fibrous covering of the present invention, with the secondary backing removed.

FIG. 6 is a side sectional view of the modular fibrous covering shown in FIG. 5, with a light-transmissive fiber being installed therein.

FIG. 7 is a side sectional view of the modular fibrous covering shown in FIG. 5, with the secondary backing in place.

DETAILED DESCRIPTION OF THE INVENTION

Figure 1:
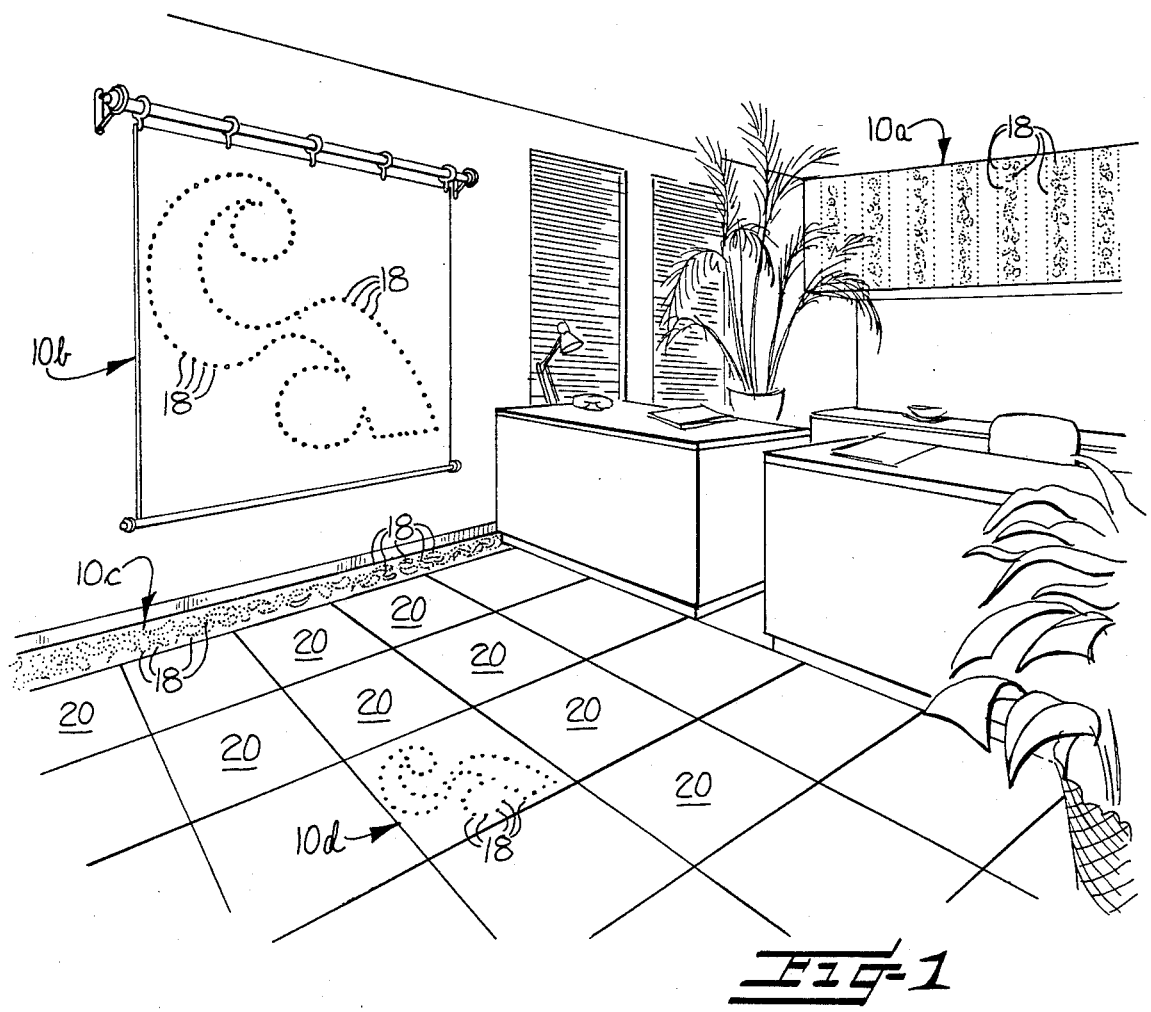
FIG. 1 is an environmental view of floor coverings and wall coverings of the present invention.

In FIG. 1, illuminable coverings of the present invention are shown in use, in an office environment, as a decorative wall covering 10a, a decorative wall hanging 10b, a floor covering 10c, and as a modular fibrous covering unit 10d. Numerous other applications of the present invention may also be made, such as the application of the modular fibrous covering unit 10d to a wall surface instead of a floor surface. The construction of these embodiments are similar, and are explained below with reference to the floor covering unit.

Figure 2:
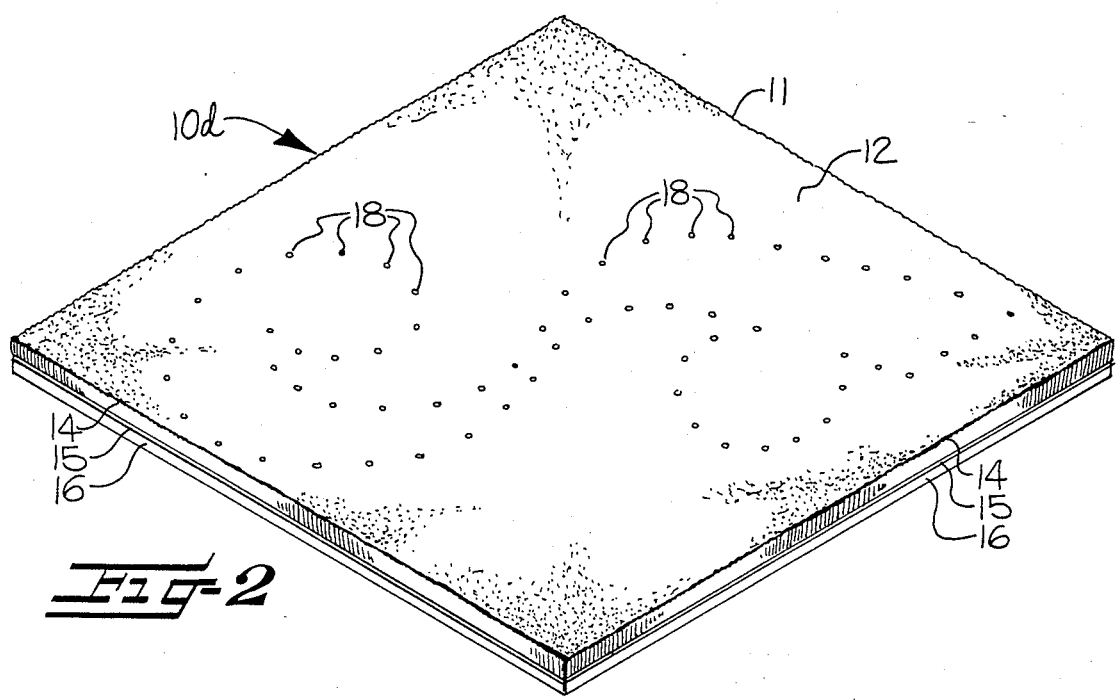
FIG. 2 is a perspective view of a modular floor covering unit of the present invention.

The floor covering unit 10d of FIG. 1 is shown in greater detail in FIG. 2. The unit is formed of a textile material 11, in this case a carpet, having a fibrous face 12, and has free end portions 18 of light-transmissive fibers 13 terminating adjacent the top surface of the fibrous face 12. The carpet material is a tufted carpet which has pile yarns 14 forming tufts on the face thereof (see also FIGS. 6 and 7). Lower portions of the pile yarns penetrate a primary backing 15, so that the primary backing supports the fibrous face. A secondary backing 16, formed of cushioning material, is adhered to the back side of the primary backing. Such a secondary backing is preferred for floor coverings, but may optionally be used with wall coverings to add further dimensional stability thereto.

Covering units of the present invention may be used as individual decorative or informational units, or in a combination covering apparatus. Such an apparatus comprises a plurality of abuttingly arranged modular covering units 20 covering a floor or wall of a structure, with at least some of the units being illuminable (see FIG. 1). The illuminable units 10d are arranged in a predetermined pattern along the floor of the structure, with a power means electrically connected to the light-emitting means in the illuminable units, so that when the light-emitting means are energized a visually discernible pattern appears in the floor or wall. Electrical wires for energizing such an apparatus are concealed beneath the covering. The apparatus may employ as a power means a low voltage power supply, such as a 6-volt A.C. power supply from a transformer, with a 6-volt D.C. battery back-up. The battery back-up is preferably maintained with a trickle charger. Alternately, as a further safeguard, the light-emitting means may be energized solely by direct current from a trickle-charged battery.

FIGS. 3 and 4 show details of the lighting assembly 30 of the present invention. A small, long life incandescent bulb 31, such as a grain of wheat bulb, is used as a light source. The bulb is installed in a protective plastic housing 32 with the lead wires 33, 34 of the bulb extending through an opening 35 in one end of the housing. The housing has a second opening, into which a bundle 36 of light-transmissive fibers 13 are inserted. One suitable housing, constructed of nylon, is available from the Packard Electric Co., and is designated "Type I."

FIG. 5 shows the arrangement of lighting means positioned on the back side of a primary backing 15, with the lighting means electrically connected to a power supply 50. The secondary backing 16, shown removed, has cut-outs or openings 17 formed therein which accommodate and receive the bulb housing 32, so that the thickness of the covering is substantially uniform when the secondary backing 16 is mounted thereon. The light-transmissive fibers 13 are kept at a short length, as illustrated, so that light loss in the fibers is minimized. Preferably, the fibers are not more than about 18 inches in length.

Further details of the construction of the present invention are shown in FIGS. 6 and 7. The light-transmissive fibers 13, as shown, have free end portions 18 which penetrate the primary backing 15 and terminate adjacent the top surface of the fibrous face. The end portions of the light-transmissive fibers 13 are positioned substantially erect and perpendicular to the primary backing 15 so that the illuminable ends of the light-transmissive fibers are not buried in the pile yarns 14, so the visual effect of the covering, when the light sources are energized, is maximized. The tufts formed by the pile yarns 14 surrounding the end portions of the fibers are, preferably, relatively dense, to aid in supporting these end portions in a substantially erect position.

Typical preferred embodiments of the invention have been disclosed in the drawings and specification above. While specific terms are employed, they are used in a generic, descriptive sense only and not for purposes of limitation, the scope of the invention being set forth in the following claims.

That which is claimed is:

1. An illuminable covering comprising a textile floor covering material of a predetermined size and shape and having a fibrous face, at least one lighting means serving as an independent light source positioned on and connected to the back of said textile floor covering material, and a plurality of elongate light-transmissive fibers connected to said lighting means and emanating therefrom and having free end portions terminating adjacent the fibrous face of the textile floor covering material for transmitting light when said lighting means is energized.

2. An illuminable covering as claimed in claim 1, wherein said lighting means comprise a plastic housing and a light source disposed within said plastic housing.

3. An illuminable covering as claimed in claim 2, wherein said light source is an incandescent bulb.

4. An illuminable covering as claimed in claim 1, further comprising a primary backing connected to and supporting said textile floor covering material, and a secondary backing formed of cushioning material adhered to the back of said primary backing.

5. An illuminable covering as claimed in claim 1, wherein said floor covering material is a tufted carpet comprising a primary backing and pile yarns forming tufts on the face of said carpet and having lower portions penetrating said primary backing.

6. An illuminable covering as claimed in claim 5, wherein said free end portions of said light-transmissive fibers are positioned substantially erect and perpendicular to said primary backing.

7. An illuminable covering as claimed in claim 6, wherein said pile tufts of said tufted carpet are relatively dense so that the pile tufts surrounding said end portions of the light-transmissive fibers aid in supporting the end portions in said substantially erect position.

8. An illuminable covering as claimed in claim 6, wherein said light-transmissive fibers are not more than about 18 inches in length.

9. An illuminable modular fibrous covering unit adapted for overlying a wall or floor surface, comprising a fabric having a fibrous face and a primary backing, said fabric having pile yarns forming tufts on the face thereof and having lower portions penetrating said primary backing, at least one plastic housing connected to the back of said primary backing, an incandescent bulb disposed in said plastic housing, and a plurality of light-transmissive fibers connected to said plastic housing, said light-transmissive fibers having free end portions penetrating said primary backing and terminating in a substantially erect position adjacent the fibrous face of the fabric for transmitting light thereto when said lighting means is energized.

10. An apparatus for providing a visually discernible illuminable pattern on a floor within a structure, comprising a carpet covering the floor, said carpet having a fibrous face and a primary backing supporting the fibrous face, a plurality of lighting means serving as independent light sources connected to the back of said primary backing, a plurality of light-transmissive fibers connected to each of said lighting means, said light-transmissive fibers having free end portions penetrating said primary backing and terminating in a predetermined pattern adjacent the face of the carpet, and power means electrically connected to said lighting means so that when said lighting means are energized by said power means a visually discernible pattern appears along the face of the carpet.

11. An apparatus as claimed in claim 10, wherein said carpet comprises a plurality of abuttingly arranged modular carpet units, at least some of said modular carpet units having said lighting means carried thereby.

12. An apparatus as claimed in claim 11, further comprising a secondary backing of cushioning material adhered to the back of said primary backing.

13. An apparatus as claimed in claim 12, wherein said carpet is a tufted carpet having pile yarns forming tufts on the face thereof and having lower portions penetrating said primary backing.

14. An apparatus as claimed in claim 13, wherein said free end portions of said light-transmissive fibers are positioned substantially erect and perpendicular to said primary backing, and wherein said pile tufts of said tufted carpet are relatively dense so that the pile tufts surrounding said end portions of the light-transmissive fibers aid in supporting the end portions in said substantially erect position.

15. An apparatus for providing a visually discernible illuminable pattern on a wall within a structure, comprising a covering mounted on the wall, said covering having a fibrous face and a primary backing supporting the fibrous face, a plurality of lighting means serving as independent light sources carried by the covering and positioned on the back of said primary backing, a plurality of light-transmissive fibers connected to each of said lighting means, said light-transmissive fibers having free end portions penetrating said primary backing and terminating in a predetermined pattern adjacent the face of said covering, and power means electrically connected to said lighting means so that when said lighting means are energized by said power means a visually discernible pattern appears in the covering.

16. An apparatus as claimed in claim 15, wherein said power means is a low voltage power supply.

17. An apparatus as claimed in claim 15, wherein said lighting means comprise a plastic housing, and an incandescent bulb disposed within said plastic housing.

18. An apparatus as claimed in claim 15, wherein said covering is a tufted material having pile yarns forming tufts on the face thereof and having lower portions penetrating said primary backing.

19. An apparatus as claimed in claim 15, wherein said end portions of said light-transmissive fibers are positioned substantially erect and perpendicular to said primary backing.

* * * * *

UNITED STATES PATENT AND TRADEMARK OFFICE
CERTIFICATE OF CORRECTION

PATENT NO. : 4,754,372

DATED : June 28, 1988

INVENTOR(S) : John M. Harrison

It is certified that error appears in the above-identified patent and that said Letters Patent is hereby corrected as shown below:

Col. 4, Line 17, delete "light when" and insert --light thereto when--

Signed and Sealed this

Fifteenth Day of November, 1988

Attest:

DONALD J. QUIGG

Attesting Officer

Commissioner of Patents and Trademarks